(12) United States Patent
Su (10) Patent No.: US 11,524,911 B2
(45) Date of Patent: Dec. 13, 2022

(54) MAGNETIZATION PURIFYING DEVICE FOR AIR AND WATER

(71) Applicants: Chen-Cheng Su, Taichung (TW); Chi-Pin Shih, Changhua County (TW)

(72) Inventor: Chen-Cheng Su, Taichung (TW)

(73) Assignees: Chen-Cheng Su, Taichung (TW); Chi-Pin Shih, Changhua County (TW)

( * ) Notice: Subject to any disclaimer, the term of this patent is extended or adjusted under 35 U.S.C. 154(b) by 136 days.

(21) Appl. No.: 16/827,438

(22) Filed: Mar. 23, 2020

(65) Prior Publication Data

US 2021/0221712 A1 Jul. 22, 2021

(30) Foreign Application Priority Data

Jan. 20, 2020 (CN) .......................... 202020131667.6

(51) Int. Cl.
*C02F 1/48* (2006.01)
*H01F 7/02* (2006.01)
*A01K 63/04* (2006.01)
*C02F 1/72* (2006.01)

(52) U.S. Cl.
CPC .............. *C02F 1/482* (2013.01); *A01K 63/04* (2013.01); *C02F 1/727* (2013.01); *H01F 7/0278* (2013.01); *C02F 2301/04* (2013.01); *C02F 2307/06* (2013.01)

(58) Field of Classification Search
CPC ......... A01K 63/04; C02F 1/482; C02F 1/727; C02F 1/74; C02F 2103/20; C02F 2301/04; C02F 2307/06; H01F 7/0278
See application file for complete search history.

*Primary Examiner* — Magali P Slawski
*Assistant Examiner* — Brad Gordon
(74) *Attorney, Agent, or Firm* — Chun-Ming Shih; Lanway IPR Services (57) ABSTRACT

A magnetization purifying device is provided. At least one or more accommodation spaces formed inside a housing unit along a preset depth or a width status are formed for accommodating a preset amount of magnetization purifying devices having corresponding status, a covering unit having an outwardly-extended engaging segment is provided and capable of being rotated for being matched with an opening formed at one end of the housing unit, another end of the housing unit capable of accommodating the magnetization purifying devices is formed with a recessed engaging segment, so that the magnetization purifying device can perform a predetermined rapid circulating magnetic force line cutting operation to introduced water or air, thereby enabling the water or air fully magnetized and discharged to be provided with anticipated pure oxygen and negative ions, thus the dissolved oxygen in water in a predetermined route, for example an aquaculture pond, can be increased.

5 Claims, 12 Drawing Sheets

MAGNETIZATION PURIFYING DEVICE FOR AIR AND WATER

BACKGROUND OF THE INVENTION

Field of the Invention

The present invention relates to magnetization purifying device for air and water, which is engaged and served to perform a magnetizing treatment to water or air at an inlet port of a large-scale object or an inlet port of an object with a faster flow speed, thereby achieving a high-efficiency magnetizing effect, thus the water or air which is at the engaged location can be preprocessed with a magnetization purifying treatment for generating pure oxygen and negative ions, so as to increase the required utilizing rate in a predetermined route.

Description of Related Art

It is know that the air is composed of 78% of nitrogen, 21% of oxygen and 1% of rare gas and impurities, in other words the oxygen contained in the air is relatively low and not suitable to be directly applied in the aquaculture industry; thus, the best condition for achieving the high yield rate and the high efficiency is to increase the oxygen. When the dissolved amount of oxygen is sufficient, the living environment of fishes can be improved, the toxic gas, for example ammonia nitrogen, nitrite nitrogen and hydrogen sulfide, which would decrease the amount of dissolved oxygen can be reduced, the above-mentioned is the necessary living condition for fishes. In the conventional aquaculture industry, the signal or increasing the dissolved oxygen is to observe a situation of fishes swimming to the water level, if the fishes swim to the water level for breathing, it means that the dissolved amount of oxygen in the water has been insufficient for at least three hours, at this moment it is too late to increase the dissolved oxygen, in other words the fishes or shrimps would be in a caring condition even if the amount of dissolved oxygen is increased after the critical timing; under said situation, the growth of fish would be affected, the immunity of fish would be obviously lower. As such, keeping the amount of dissolved amount of oxygen to be high is to create a good living environment for the fishes and shrimps, so that the metabolism of the fishes and shrimps can be proper, the possibility of getting sick can be lower, the growth rate can be increased, and the utility rate of bait is relatively higher, thereby allowing the aquaculture industry to be provided with a stable economic benefit and a high harvesting rate.

As a result, the skilled people in the art has developed an assembly for processing a magnetizing treatment to water molecules for increasing the amount of dissolved oxygen in the aquaculture industry, the assembly for performing the magnetizing treatment to water molecules has various types, wherein a means of arranging a plurality of magnets to be combined with in a preset range defined in a preset accommodating member so as to form a magnetic zone, so that the processing unit is able to be engaged with an outlet port of an external water source, and the water accommodated in the accommodating member can be processed with a circulating cutting treatment via the magnetic force revolve generated in the magnetic zone, thereby enabling the water to be magnetized and cut into a status of having a smaller molecule size so as to be used as drinking water, domestic cleaning water, applied in the agriculture or aquaculture fields.

SUMMARY OF THE INVENTION

For solving the above-mentioned disadvantages, the present invention provides a magnetization purifying device for air and water, which is engaged and served to perform a magnetizing and purifying treatment to introduced water or air at an inlet port of an object located in a predetermined route, thereby achieving an anticipated magnetizing efficiency; at least one or more accommodation spaces formed inside a housing unit along a preset depth or a width status are formed for accommodating a preset amount of magnetization purifying devices having corresponding status, a covering unit having an outwardly-extended engaging segment is provided and capable of being rotated for being matched with an opening formed at one end of the housing unit, another end of the housing unit capable of accommodating the magnetization purifying devices is formed with a recessed engaging segment, so that the magnetization purifying device can perform a predetermined rapid circulating magnetic force line cutting operation to introduced water or air, thereby enabling the water or air fully magnetized and discharged to be provided with anticipated pure oxygen and negative ions, thus the dissolved oxygen in water in a predetermined route, for example an aquaculture pond, can be increased.

One primary objective of the present invention is to provide a magnetization purifying device for air and water, which is engaged and served to perform a magnetizing treatment to water or air at an inlet port of an object with a faster flow speed, thereby achieving a high-efficiency magnetizing effect; the magnetization purifying device includes an carrying base having each periphery formed with a recessed part with at least one or more layers of outwardly-orienting notches, a corresponding amount of magnets having the corresponding states are disposed thereon, and a plurality of blocking units respectively having a matched width is disposed for restraining each magnet in the carrying base, and a guiding space formed in a longitudinally penetrating status is formed at a central location of the carrying base, thereby forming a magnetic conducting zone unit; one technical solution to be claimed is as follows: a guiding end is respectively and inwardly formed at a top surface and a bottom surface of the carrying base, each guiding end is in communication with the guiding space at the central location, the guiding space has two long-side surfaces and two short-side surfaces, the two long-side surfaces are arranged to be parallel to each other so as to form a rectangular channel, a width interval between the two long-side surfaces of the rectangular channel is preferably to be between 0.3 m/m~6.5 m/m, and each of the long-side surfaces can be a smooth surface or can be a rough surface, thereby allowing the magnetizing effect to be better, a concave zone is respectively and concavely formed at a circumference defined at the top end and the bottom end of the carrying base, thereby allowing an O-ring to be disposed and properly tightened; the carrying base having each periphery disposed with the magnet is received in a housing unit, an accommodation space having a preset depth is formed at a central portion of the housing unit, thereby allowing at least two or more of the carrying bases to be connected in series therein, a covering unit having an outwardly-extended engaging segment is provided and capable of being rotated for being matched with an opening formed at one end of the housing unit, another end of the housing unit where the preset amount of the magnetic conducting zone units are accommodated is formed with a recessed engaging segment, so that the magnetization purifying device is able to perform a predetermined rapid circulating magnetic force line cutting operation to water introduced from the recessed engaging segment or air, thereby enabling the water or the air fully magnetized and discharged from the engaging segment at the other end to be provided with anticipated pure oxygen and negative ions, thus the dissolved oxygen in water in a predetermined route, for example an aquaculture pond, can be increased.

Another objective of the present invention is to provide a magnetization purifying device for air and water which is engaged and served to perform a magnetizing treatment to water or air at the inlet port of a large-scale object to have a high-efficiency magnetizing effect; the magnetization purifying device includes an carrying base having each periphery formed with a recessed part with at least one or more layers of outwardly-orienting notches, a corresponding amount of magnet having the corresponding states are disposed thereon, and a plurality of blocking units respectively having a matched width is disposed for restraining each magnet in the carrying base, and a guiding space formed in a longitudinally penetrating status is formed at a central location of the carrying base, thereby forming a magnetic conducting zone unit; one technical solution to be claimed is as follows: a guiding end is respectively and inwardly formed at a top surface and a bottom surface of the carrying base, each guiding end is in communication with the guiding space at the central location the guiding space has two long-side surfaces and two short-side surfaces, the two long-side surfaces are arranged to be parallel to each other so as to form a rectangular channel, a width interval between the two long-side surfaces of the rectangular channel is preferably to be between 0.3 m/m~6.5 m/m, and each of the long-side surfaces can be a smooth surface or can be a rough surface, thereby allowing the magnetizing effect to be better, a concave zone is respectively and concavely formed at a circumference defined at the top end and the bottom end of the carrying base, thereby allowing an O-ring to be disposed and properly tightened; the carrying base having each periphery disposed with the magnet is received in a housing unit, the housing unit includes a seat and a housing allowing the seat to be disposed therein, a plurality of holes, respectively formed in a longitudinally penetrating status, are formed within a preset ranger of the seat, so that the corresponding amount of magnetic conducting zones having the corresponding states can be disposed, an accommodation space having a preset depth is formed at a central portion of the housing and an O-ring matched with the inner circumference is provided before being disposed in the seat, thereby forming a gap between the bottom side of the seat and the interior of the housing, a covering unit having an outwardly-extended engaging segment is provided and capable of being rotated for being matched with an opening formed at one end of the housing where the seat is disposed, an O-ring matched with the inner circumference is provided at the top end of the seat before the covering unit is rotated into the seat, thereby forming a gap between the inner side of the covering unit before being rotated and the top end of the seat, another end of the housing of the seat where the preset amount of the magnetic conducting zone units are accommodated is formed with a recessed engaging segment, so that the magnetization purifying device is able to perform a predetermined rapid circulating magnetic force line cutting operation to water introduced from the recessed engaging segment or air, thereby enabling the water or the air fully magnetized and discharged from the engaging segment at the other end to be provided with anticipated pure oxygen and negative ions, thus the dissolved oxygen in water in a predetermined route, for example an aquaculture pond, can be increased.

One another objective of the present invention is to provide a magnetization purifying device for air and water, which includes a preset amount of magnetic conducting zone units disposed within and a housing unit having one end provided with a matched rotating covering unit outwardly extended with an engaging segment and a recessed engaging segment at another end of the housing unit are respectively formed as an outer thread and an inner thread, thereby being served as a pipeline connector of a predetermined route.

BRIEF DESCRIPTION OF THE CODES

1: Carrying base
11: Recessed part

12: Magnet
13: Blocking unit
14: Guiding space
15: Guiding end
16: Concave zone
17, 35: O-ring
2: Magnetic conducting zone unit
3, 3': Housing unit
31, 341: Accommodation space
32, 342, 41, 41': Engaging segment
33: Seat
331: Hole
34: Housing
4, 4': Covering unit
5, 5': Magnetization purifying device
6: Aquaculture pond
61: Air compressor
62, 81: Pipeline
7: Water pipe
71: User end
72: Water gauge
73: Faucet

DETAILED DESCRIPTION OF THE PREFERRED EMBODIMENT

Figure 9:
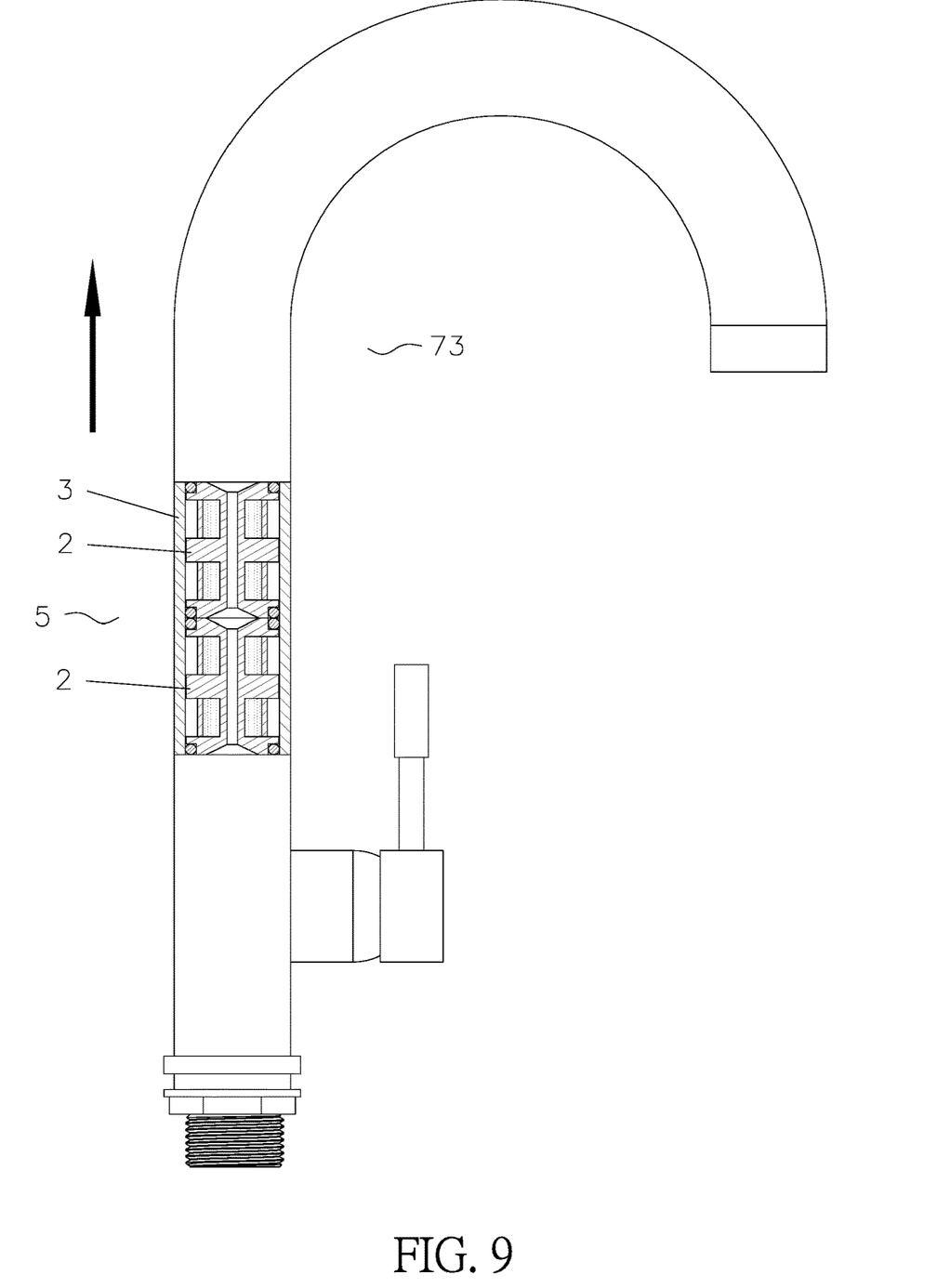
FIG. 9 is a schematic view showing the magnetization purifying device being in the serial-connecting status and disposed in a faucet according to the present invention.
Figure 10:
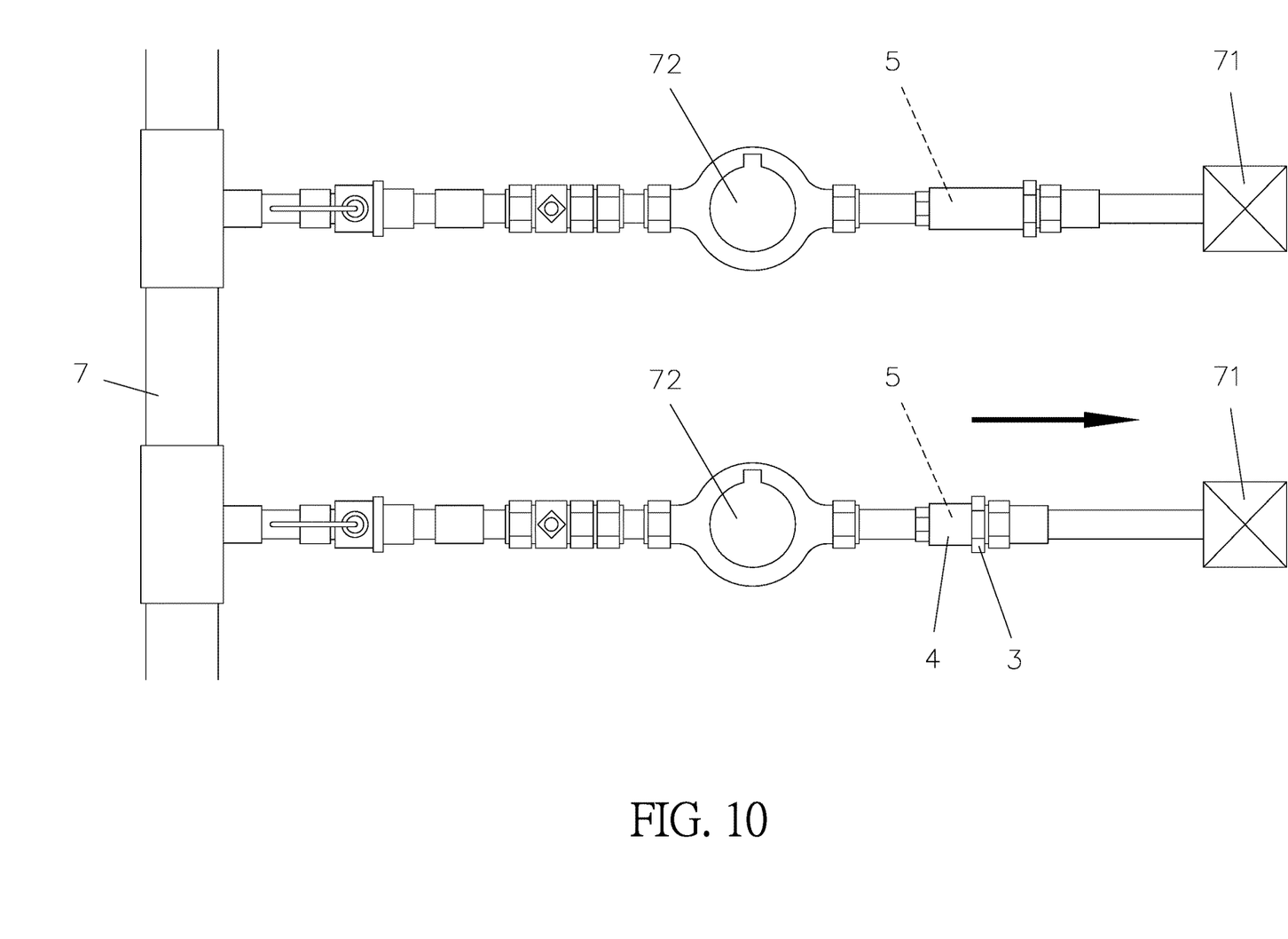
FIG. 10 is a schematic view showing the magnetization purifying device being in the serial-connecting status or being in a single-installed status and disposed in a pipeline of a user according to the present invention.
Figure 12:
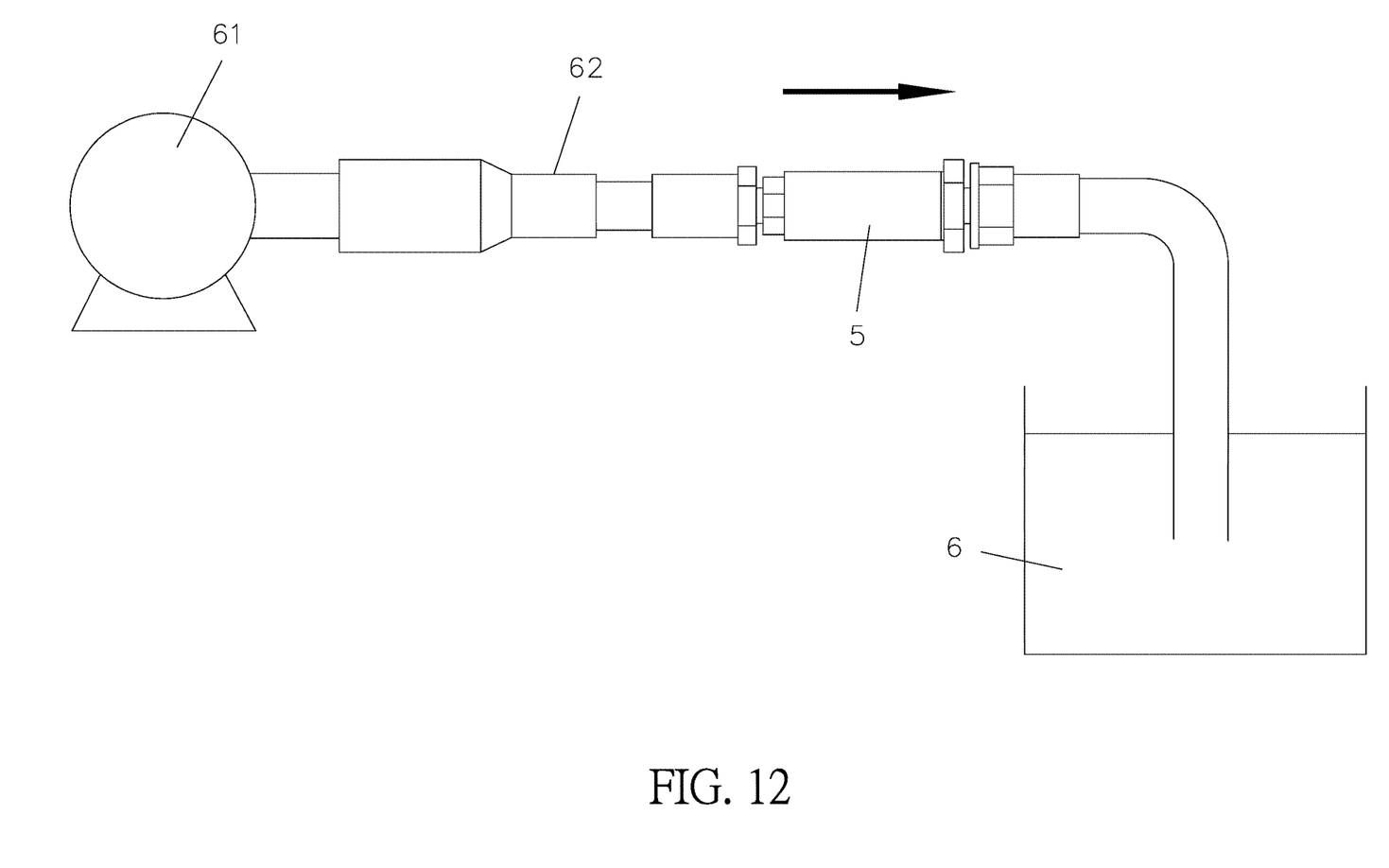
FIG. 12 is a schematic view showing the magnetization purifying device being in the serial-connecting status and disposed in an air pipeline according to the present invention.

The present invention provides a magnetization purifying device for air and water (as shown in FIG. 9 and FIG. 10), which is engaged and served to perform a magnetizing treatment to water or air at an inlet port of an object with a faster flow speed, thereby achieving a high-efficiency magnetizing effect. Please refer from FIG. 1 to FIG. 3, the magnetization purifying device 5 includes an carrying base 1 having each periphery formed with a recessed part 11 with at least one or more layers of outwardly-orienting notches, a corresponding amount of magnet 12 having the corresponding states are disposed thereon, and a plurality of blocking units 13 respectively having a matched width is disposed for restraining each magnet 12 in the carrying base 1, an iron sheet is preferably adopted as the blocking unit 13, because the iron sheet can be magnetized for increasing the strong magnetic field, and a guiding space 14 formed in a longitudinally penetrating status is formed at a central location of the carrying base 1, thereby forming a magnetic conducting zone unit 2; what shall be addressed is that the above-mention is an application means of the present invention and shall not be deemed as the main technical feature of the present invention, one technical solution to be claimed is as follows: a guiding end 15 (as shown in FIG. 1, FIG. 3 and FIG. 14) is respectively and inwardly formed at a top surface and a bottom surface of the carrying base 1, each guiding end 15 is in communication with the guiding space 14 at the central location, the guiding space 14 has two long-side surfaces 141 and two short-side surfaces 142, the two long-side surfaces 141 are arranged to be parallel to each other so as to form a rectangular channel, a width interval D between the two long-side surfaces 141 of the rectangular channel is preferably to be between 0.3 m/m~6.5 m/m, and each of the long-side surfaces 141 can be a smooth surface or can be a rough surface, thereby allowing the magnetizing effect to be better, water or air is able to pass the guiding space 14 formed as the rectangular channel for being processed with a better magnetizing effect, a concave zone 16 is respectively and concavely formed at a circumference defined at the top end and the bottom end of the carrying base 1, thereby allowing an O-ring 17 to be disposed and properly tightened; the carrying base 1 having each periphery disposed with the magnet 12 is received in a housing unit 3, an accommodation space 31 having a preset depth is formed at a central portion of the housing unit 3, thereby allowing at least two or more of the carrying bases 1 to be connected in series therein (as shown in FIG. 5), a covering unit 4 having an outwardly-extended engaging segment 41 is provided and capable of being rotated for being matched with an opening formed at one end of the housing unit 3, another end of the housing unit 3 where the preset amount of the magnetic conducting zone units 2 are accommodated is formed with a recessed engaging segment 32, so that the magnetization purifying device 5 (as shown in FIG. 4) is able to perform a predetermined rapid circulating magnetic force line cutting operation to water introduced from the recessed engaging segment 32 (as shown in FIG. 10, wherein the magnetization purifying device 5 being arranged at an upper end and in serial-connecting status is engaged with a pipeline having a faster flow speed, and the single-installed magnetic conducting zone arranged at a lower end is engaged with a pipeline having a normal flow speed) or air (as shown in FIG. 12), thereby enabling the water or the air fully magnetized and discharged from the engaging segment 41 at the other end to be provided with anticipated pure oxygen and negative ions, thus the dissolved oxygen in water in a predetermined route, for example an aquaculture pond 6, can be increased.

Figure 1:
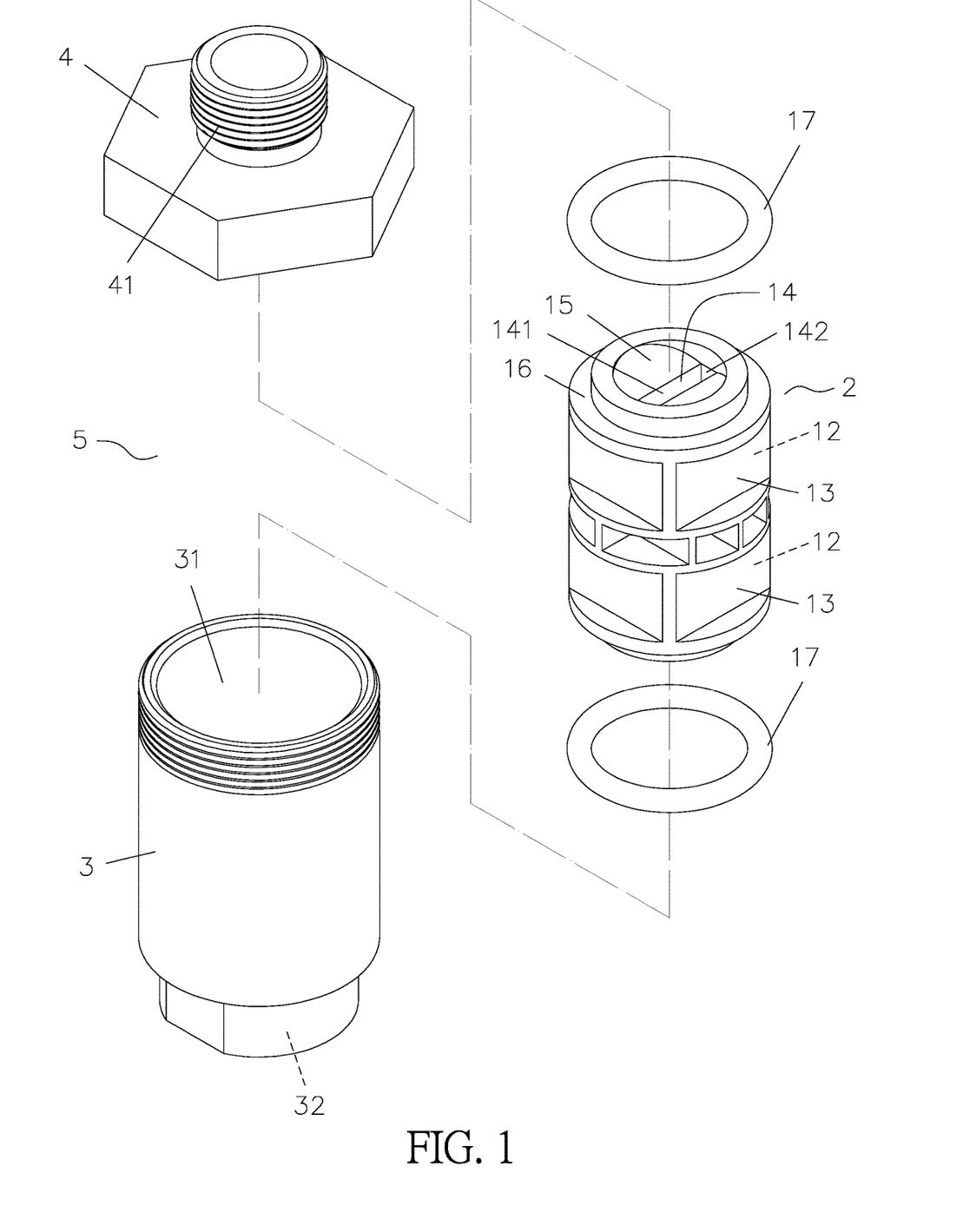
FIG. 1 is a perspective exploded view showing the magnetization purifying device according to the present invention.
Figure 2:
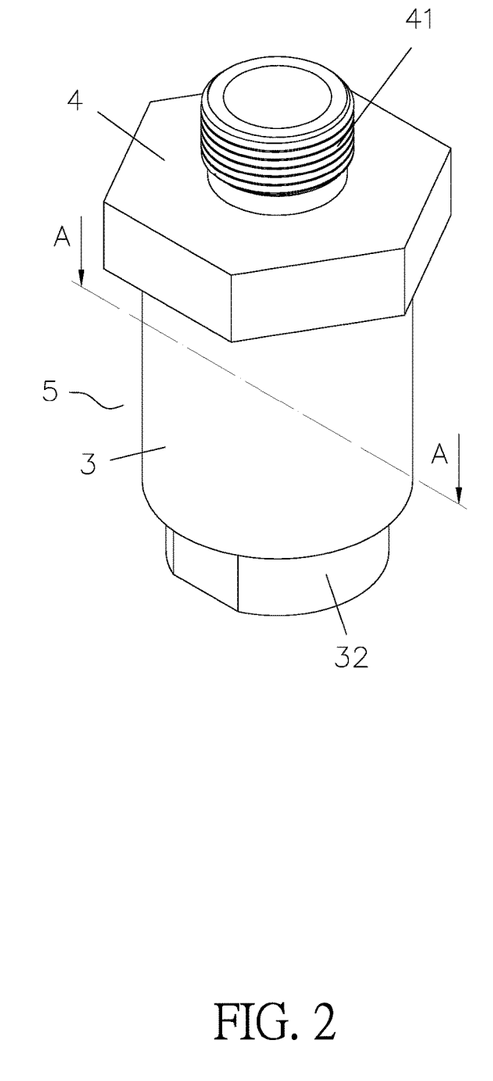
FIG. 2 is a perspective view showing the magnetization purifying device according to the present invention.
Figure 3:
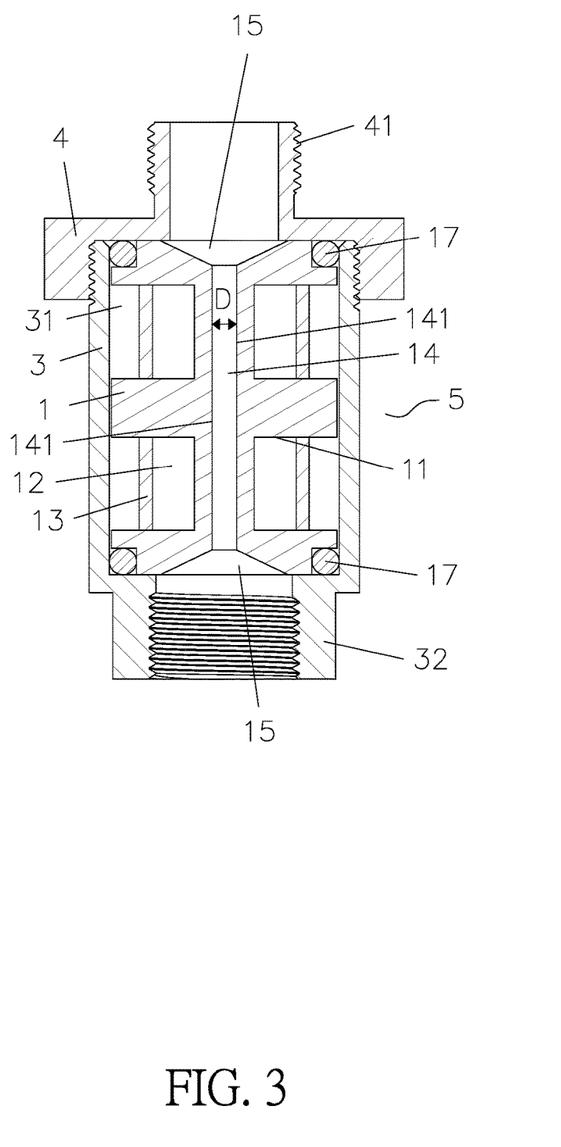
FIG. 3 is a cross sectional view showing the magnetization purifying device taken in an axial direction according to the present invention.
Figure 4:
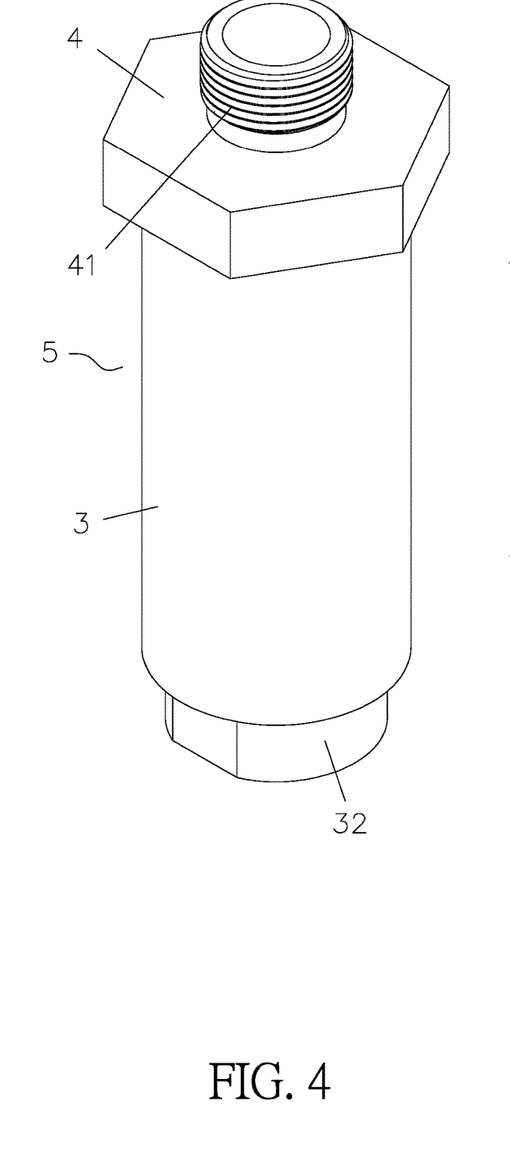
FIG. 4 is a perspective view showing the magnetization purifying device being in a serial-connecting status according to the present invention.
Figure 6:
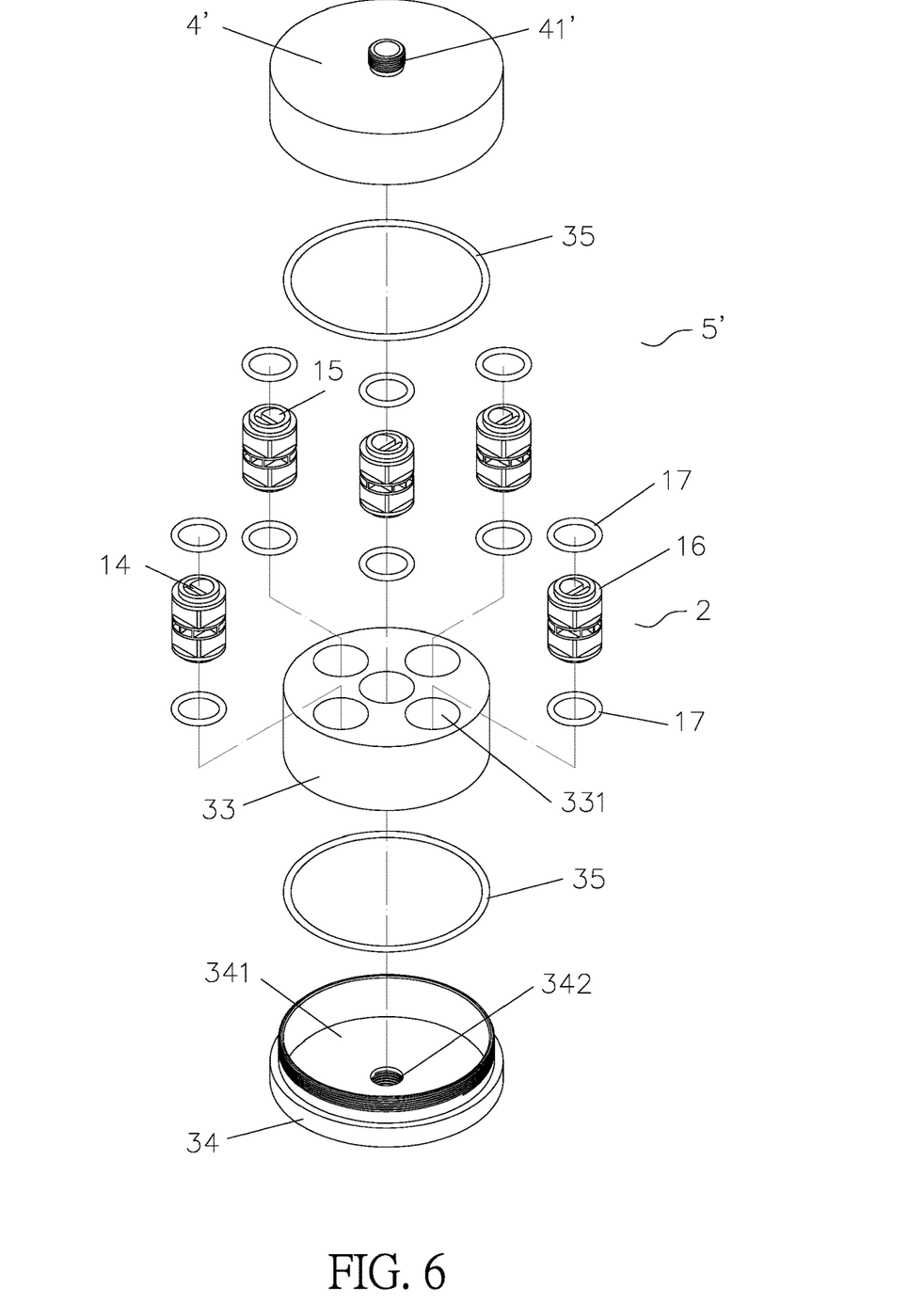
FIG. 6 is an exploded view showing the magnetization purifying device being in a parallel-connecting status according to the present invention.
Figure 7:
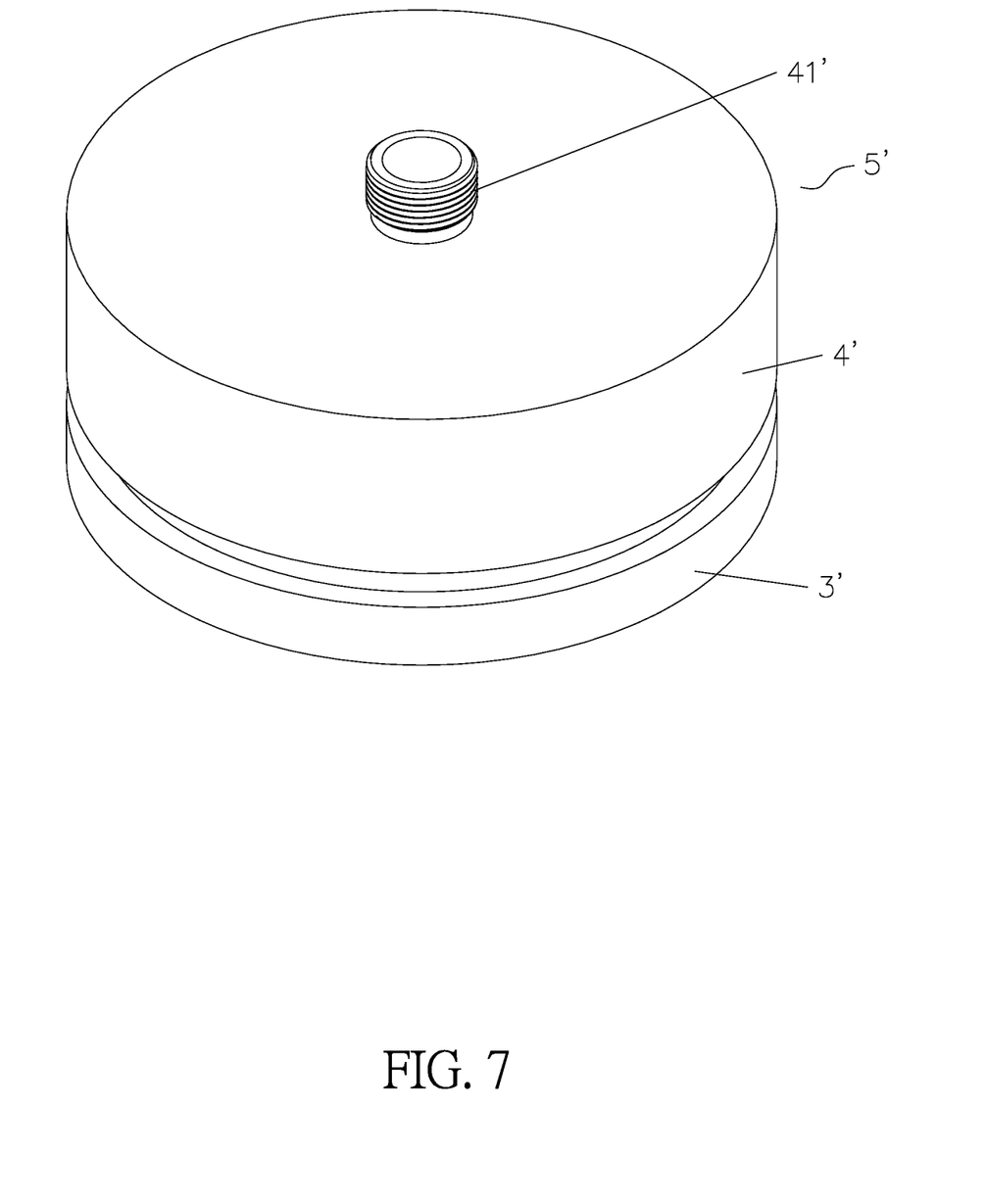
FIG. 7 is a perspective view showing the magnetization purifying device being in the parallel-connecting status according to the present invention.
Figure 8:
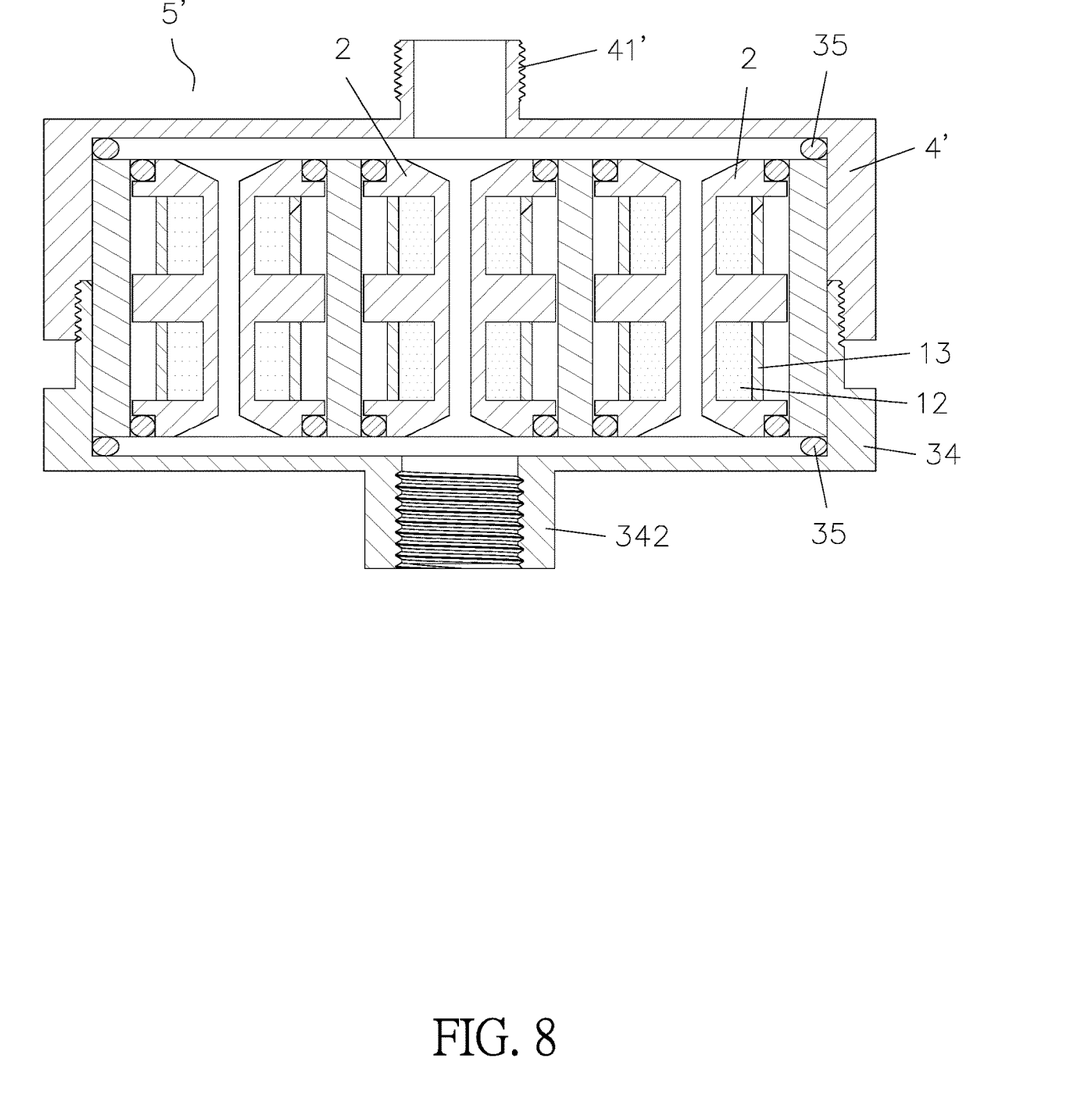
FIG. 8 is a cross sectional view showing the magnetization purifying device being in the parallel-connecting status taken in an axial direction according to the present invention.
Figure 11:
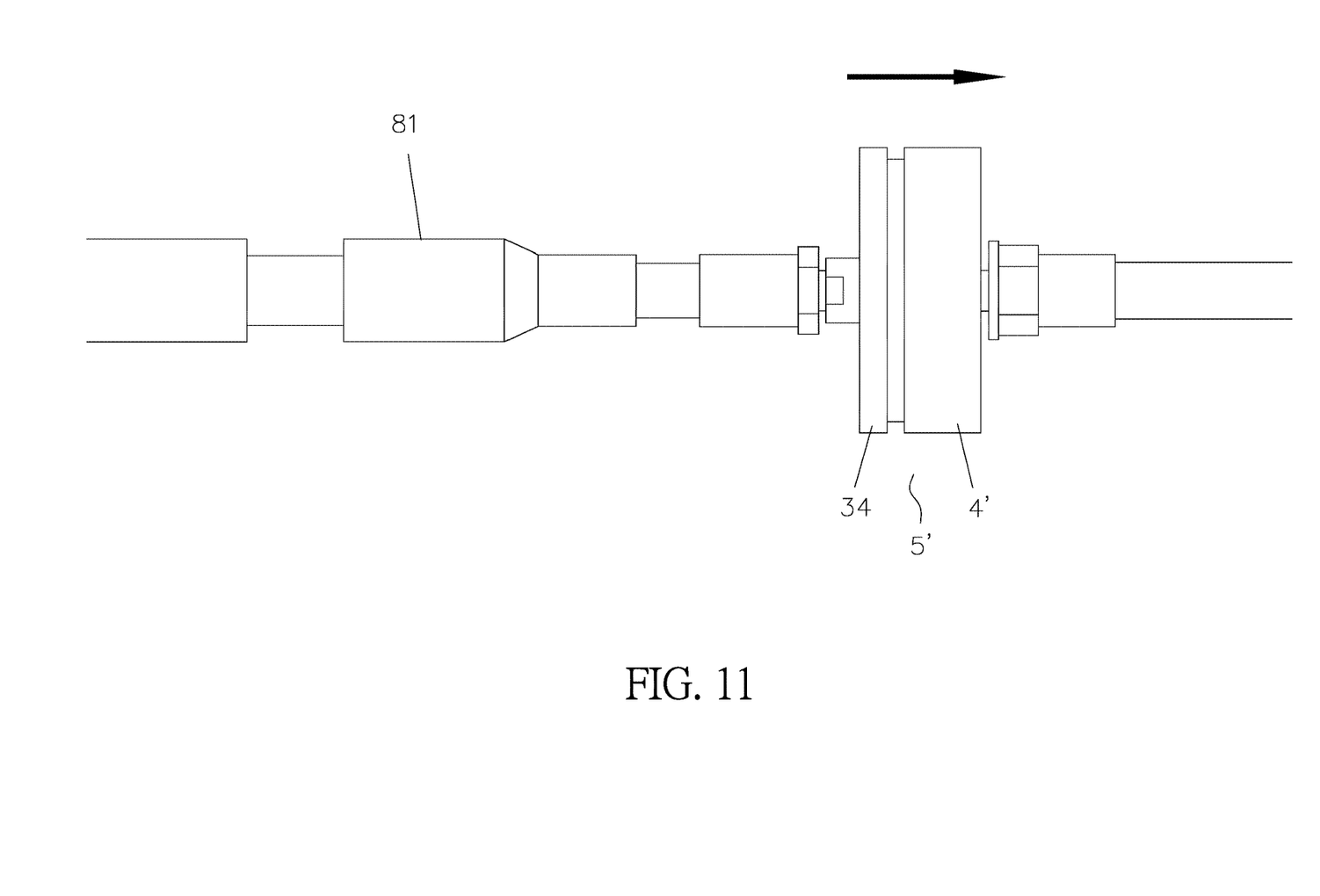
FIG. 11 is a schematic view showing the magnetization purifying device being in the parallel-connecting status and disposed in a water introducing pipeline according to the present invention.
Figure 13:
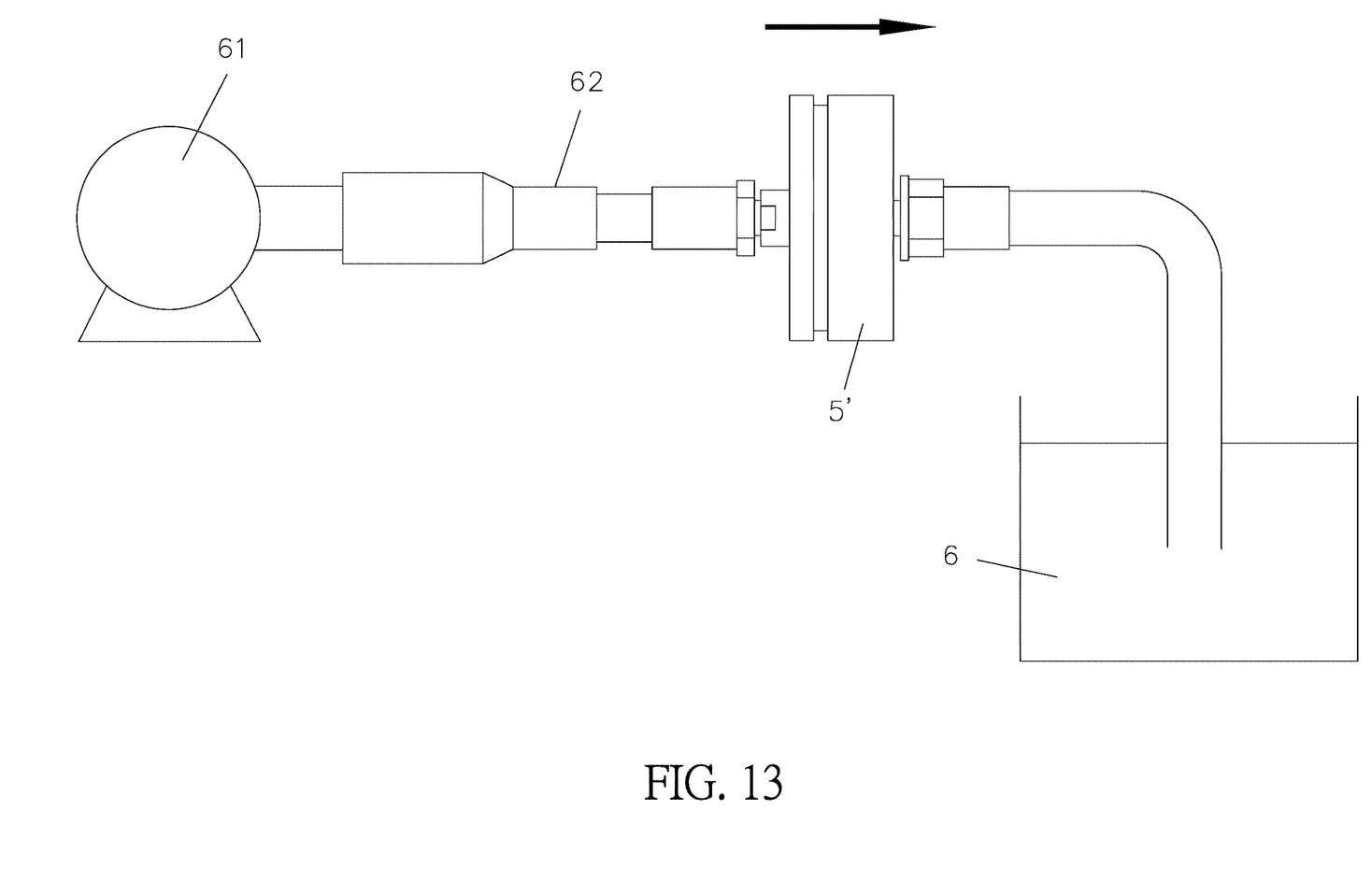
FIG. 13 is a schematic view showing the magnetization purifying device being in the parallel-connecting status and disposed in the air pipeline according to the present invention.
Figure 14:
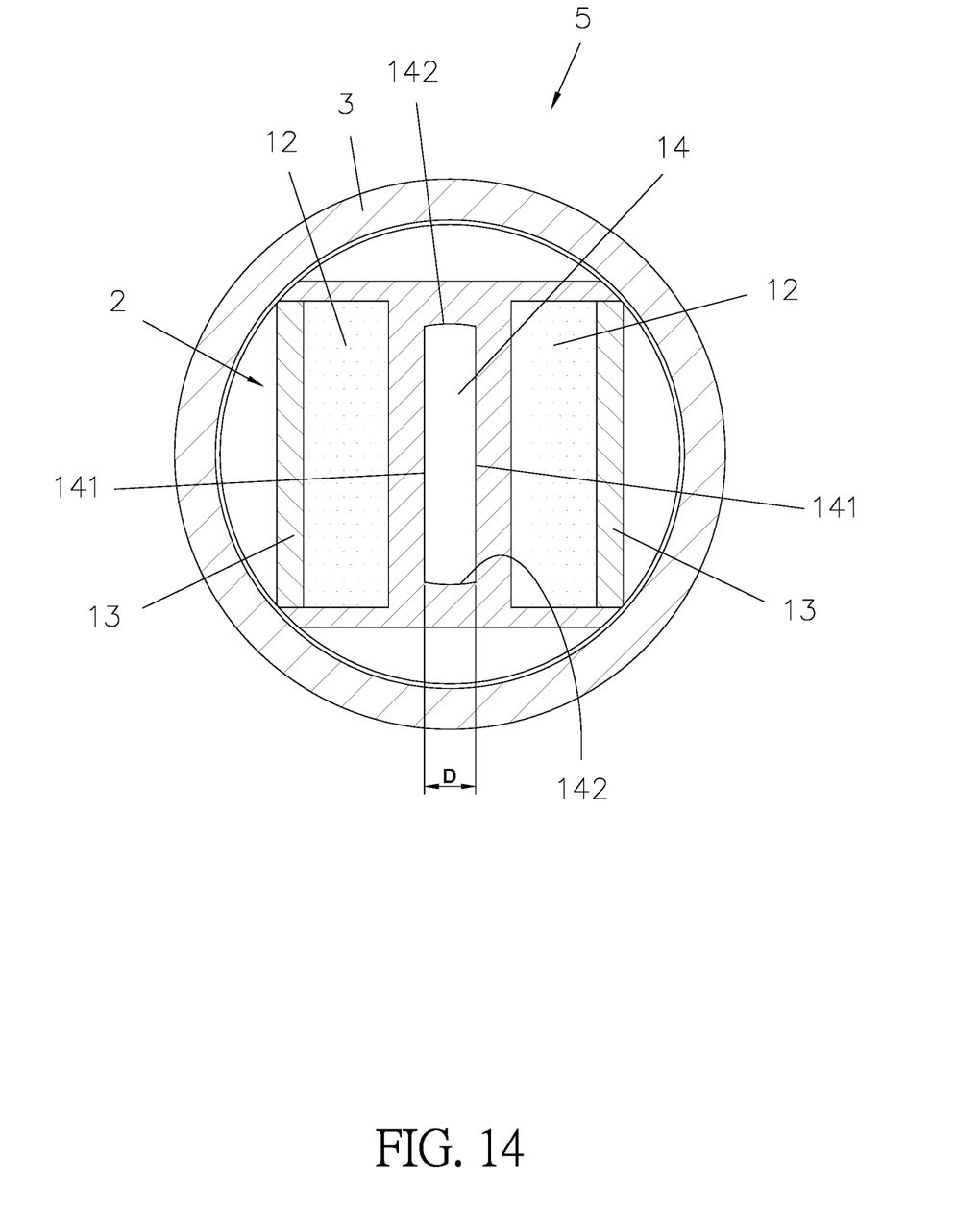
FIG. 14 is a cross sectional view showing the magnetization purifying device of FIG. 2 taken along an A-A line in a horizontal direction according to the present invention.

According to the present invention and for achieving an effect of performing the magnetizing treatment to water or air at the inlet port of a large-scale object (as shown in FIG. 11 and FIG. 13) to have the same high-efficiency magnetizing effect, a technical solution provided by the present invention is illustrated as follows: a magnetization purifying device 5' (as shown from FIG. 1 to FIG. 3) includes an carrying base 1 having each periphery formed with a recessed part 11 with at least one or more layers of outwardly-orienting notches, a corresponding amount of magnets 12 having the corresponding states are disposed thereon, and a plurality of blocking units 13 respectively having a matched width is disposed for restraining each magnet 12 in the carrying base 1, and a guiding space 14 formed in a longitudinally penetrating status is formed at a central location of the carrying base 1, thereby forming a magnetic conducting zone unit 2; what shall be addressed is that the above-mention is an application means of the present invention and shall not be deemed as the main technical feature of the present invention, the main technical feature to be claimed is as follows: a guiding end 15 (as shown in FIG. 1, FIG. 3 and FIG. 14) is respectively and inwardly formed at a top surface and a bottom surface of the carrying base 1, each guiding end 15 is in communication with the guiding space 14 at the central location, the guiding space 14 has the two long-side surfaces 141 and the two short-side surfaces 142, the two long-side surfaces 141 are arranged to be parallel to each other so as to form a rectangular channel, the width interval D between the two long-side surfaces 141 of the rectangular channel is preferably to be between 0.3 m/m~6.5 m/m, and each of the long-side surfaces 141 can be a smooth surface or can be a rough surface, thereby allowing the magnetizing effect to be better, a concave zone 16 is respectively and concavely formed at a circumference defined at the top end and the bottom end of the carrying base 1, thereby allowing an O-ring 17 to be disposed and properly tightened; the carrying base 1 having each periphery disposed with the magnet 12 is received in a housing unit 3' (as show in FIG. 6), the housing unit 3' includes a seat 33 and a housing 34 allowing the seat 33 to be disposed therein, wherein a plurality of holes 331, respectively formed in a longitudinally penetrating status, are formed within a preset ranger of the seat 33, so that the corresponding amount of magnetic conducting zones 2 (as shown in FIG. 8) having the corresponding states can be disposed, an accommodation space 341 having a preset depth is formed at a central portion of the housing 34 and an O-ring 35 matched with the inner circumference is provided before being disposed in the seat 33, thereby forming a gap between the bottom side of the seat 33 and the interior of the housing 34, a covering unit 4' having an outwardly-extended engaging segment 41' is provided and capable of being rotated for being matched with an opening formed at one end of the housing 34 where the seat 33 is disposed, an O-ring 35 matched with the inner circumference is provided at the top end of the seat 33 before the covering unit 4' is rotated into the seat 33, thereby forming a gap between the inner side of the covering unit 4' before being rotated and the top end of the seat 33, another end of the housing 34 of the seat 33 where the preset amount of the magnetic conducting zone units 2 are accommodated is formed with a recessed engaging segment 342, so that the magnetization purifying device 5' is able to perform a predetermined rapid circulating magnetic force line cutting operation to water introduced from the recessed engaging segment 342 (as shown in FIG. 7 and FIG. 10) or air (as shown in FIG. 13), thereby enabling the water or the air fully magnetized and discharged from the engaging segment 41' at the other end to be provided with anticipated pure oxygen and negative ions, thus the dissolved oxygen in water in a predetermined route, for example an aquaculture pond 6, can be increased.

Figure 5:
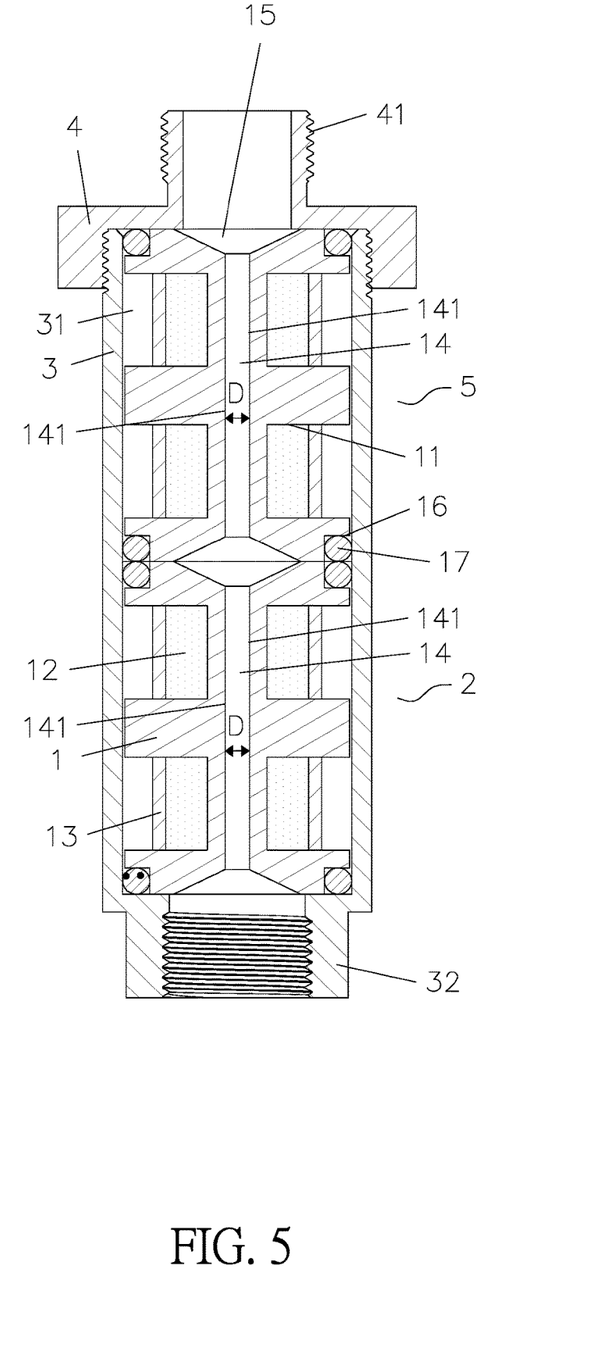
FIG. 5 is a cross sectional view showing the magnetization purifying device being in the serial-connecting status taken in an axial direction according to the present invention.

Based on what has been disclosed above, the interior of the magnetization purifying device 5, 5' includes the preset amount of magnetic conducting zone units 2 and the housing unit 3, 3' having one end provided with the matched rotating covering unit 4, 4' outwardly extended with the engaging segment 41, 41' and the recessed engaging segment 32, 342 at the other end of the housing unit 3, 3' are respectively formed as an outer thread and an inner thread (as shown in FIG. 5 and FIG. 8), thereby being served as a pipeline connector of the predetermined route.

Based on what has been disclosed above, the magnetization purifying device 5 is disposed at a preset section of a faucet 73 for the purpose of water magnetization (as shown in FIG. 9), the preset amount of magnetic conducting zone units 2 are received in the hollow cylindrical housing unit 3, so that the magnetization purifying device 5 in the serial-connecting status can be used for magnetizing water in a predetermined route of the faucet 73 with a faster flow speed.

Based on what has been disclosed above, the magnetization purifying device 5 can be applied in a water pipe 7 of a building for the purpose of water magnetization (as shown in FIG. 10), the magnetization purifying device 5 with the preset status (for example the serial-connecting status shown in FIG. 5 or the single-installed magnetic conducting zone unit shown in FIG. 3) is disposed at a predetermined section of a water inlet end of a water gauge 72 of a user end 71, so that an anticipated magnetizing effect can be provided to inputting water.

Based on what has been disclosed above, the magnetization purifying device 5 can be applied in the aquaculture pond 6 for magnetizing air (as shown in FIG. 12), the magnetization purifying device 5 in the serial-connecting status is disposed at a predetermined section of a pipeline 62 between an air compressor 61 and the aquaculture pond 6, so that external air can be introduced and processed with a magnetizing treatment then be outputted into the aquaculture pond 6.

Based on what has been disclosed above, the magnetization purifying device 5' can be applied in a discharging pipeline of industrial waste water for allowing the discharged waste water to be magnetized so as to be reused (as shown in FIG. 11), the magnetization purifying device 5' in the parallel-connecting status is disposed at a predetermined section of a water source discharging pipeline 81, so that the discharged water can be processed with an anticipated magnetizing treatment then be guided to a desired location for being used.

Based on what has been disclosed above, the magnetization purifying device 5' can be applied in the aquaculture pond 6 for magnetizing air (as shown in FIG. 13), the magnetization purifying device 5' in the parallel-connecting status is disposed at a predetermined section of the pipeline 62 between the air compressor 61 and the aquaculture pond 6, so that external air can be introduced and processed with a magnetizing treatment then be outputted into the aquaculture pond 6.

Accordingly, the technical characterizes of the present invention is as follows. The guiding end 15 is respectively and inwardly formed at the top surface or the bottom surface of the carrying base 1, the guiding space 14 at the central location of the carrying base 1 is formed with the two long sides and the two short sides, thereby being formed as the rectangular channel, the carrying base 1 is formed with the at least four peripheries at the axial cross section defined by being parallel to the carrying base 1 in the normal vector; with the above-mentioned structure, a strong magnetic field can be formed via the small diameter and the great magnetic force, and the magnetizing effect can be enhanced via the faster flow speed, the magnetic force lines can be kept in a perpendicular status so as to ensure the stability of the magnetizing effect, thereby allowing the water to be provided with the optimal magnetizing effect.

What is claimed is:

1. A magnetization purifying device for air and water, including a housing unit and a carry base, wherein the carry base is formed with a plurality of recessed parts, wherein a plurality of magnets are respectively disposed in the plurality of recessed parts, wherein a plurality of blocking units are respectively provided for restraining the plurality of magnets in the carry base, and wherein a guiding space formed in a longitudinally penetrating status is formed at a central location of the carry base, thereby forming a magnetic conducting zone unit, and the magnetic conducting zone unit is disposed in the housing unit; and
   wherein a guiding end is respectively and inwardly formed at a top surface and a bottom surface of the carry base, and each guiding end is in communication with the guiding space at the central location, the guiding space has two long-side surfaces and two short-side surfaces, the two long-side surfaces are arranged to be parallel to each other so as to form a rectangular channel.

2. The magnetization purifying device as claimed in claim 1,
   wherein a concave zone is formed at a circumference defined at the top end of the carry base and a concave zone is formed at a circumference defined at the bottom end of the carry base, each concave zone having an O-ring disposed thereon;
   wherein an accommodation space having a depth is formed at a central portion of the housing unit for allowing at least two of the carry bases in a serial-connection status to be accommodated, a covering unit having an outwardly-extending engaging segment is provided and capable of being rotated and is matched with an opening formed at one end of the housing unit;

wherein another end of the housing unit is formed with a recessed engaging segment.

3. The magnetization purifying device as claimed in claim 1, wherein a concave zone is formed at a circumference defined at the top end of the carry base and a concave zone is formed at a circumference defined at the bottom end of the carry base, each concave zone having an O-ring disposed thereon;

the housing unit includes a seat and a housing, the housing allowing the seat to be disposed therein, wherein a plurality of holes, respectively formed in a longitudinally penetrating status, are formed within the seat;

an accommodation space having a depth is formed at a central portion of the housing and a second O-ring matched with an inner circumference of the housing is provided and is disposed in the seat, thereby forming a first gap between the bottom side of the seat and an interior of the housing;

a covering unit having an outwardly-extending engaging segment is provided and is capable of being rotated for being matched with an opening formed at one end of the housing where the seat is disposed;

a third O-ring matched with the inner circumference of the housing is provided at a top end of the seat, thereby forming a second gap between an inner side of the covering unit and the top end of the seat; and wherein another end of the housing is formed with a recessed engaging segment.

4. The magnetization purifying device as claimed in claim 2, wherein the outwardly-extended engaging segment and the recessed engaging segment are respectively formed as an outer thread and an inner thread.

5. The magnetization purifying device as claimed in claim 3, wherein the outwardly-extended engaging segment and the recessed engaging segment are respectively formed as an outer thread and an inner thread.

* * * * *